(12) United States Patent
Zhao et al.

(10) Patent No.: US 11,269,124 B2
(45) Date of Patent: Mar. 8, 2022

(54) LIGHT GUIDE STRUCTURE AND DISPLAY DEVICE

(71) Applicants: BOE TECHNOLOGY GROUP CO., LTD., Beijing (CN); FUZHOU BOE OPTOELECTRONICS TECHNOLOGY CO., LTD., Fujian (CN)

(72) Inventors: Hongyu Zhao, Beijing (CN); Kai Diao, Beijing (CN); Jie Liu, Beijing (CN); Zongjie Bao, Beijing (CN); Han Zhang, Beijing (CN)

(73) Assignees: BOE TECHNOLOGY GROUP CO., LTD., Beijing (CN); FUZHOU BOE OPTOELECTRONICS TECHNOLOGY CO., LTD., Fujian (CN)

( * ) Notice: Subject to any disclaimer, the term of this patent is extended or adjusted under 35 U.S.C. 154(b) by 816 days.

(21) Appl. No.: 16/073,382

(22) PCT Filed: Dec. 15, 2017

(86) PCT No.: PCT/CN2017/116467
§ 371 (c)(1),
(2) Date: Jul. 27, 2018

(87) PCT Pub. No.: WO2018/227909
PCT Pub. Date: Dec. 20, 2018

(65) Prior Publication Data
US 2021/0208326 A1    Jul. 8, 2021

(30) Foreign Application Priority Data

Jun. 13, 2017  (CN) .......................... 201710442895.8

(51) Int. Cl.
| | |
|---|---|
| *G02B 6/00* | (2006.01) |
| *F21V 8/00* | (2006.01) |
| *G02B 6/04* | (2006.01) |

(52) U.S. Cl.
CPC ............. *G02B 6/0005* (2013.01); *G02B 6/04* (2013.01)

(58) Field of Classification Search
CPC ............................... G02B 6/0005; G02B 6/04
(Continued)

(56) References Cited

U.S. PATENT DOCUMENTS 4,417,412 A * 11/1983 Sansom .................. G09F 9/305
                                                      40/547
6,195,016 B1    2/2001 Shankle et al.
(Continued)

FOREIGN PATENT DOCUMENTS

| CN | 1816718 A | 8/2006 |
| CN | 103796056 A | 5/2014 |
| JP | 07318708 A | 12/1995 |

OTHER PUBLICATIONS

International Search Report and Written Opinion dated Mar. 14, 2018; PCT/CN2017/116467.

*Primary Examiner* — Jerry M Blevins (57) ABSTRACT

A light guide structure and a display device are provided. The light guide structure includes: a first substrate including at least one first through hole; a second substrate arranged opposite to the first substrate and including at least one second through hole; and at least one fiber bundle including a first end and a second end, the first end of each of the fiber bundle fixed in one of the first through holes, and the second end of the fiber bundle is a free end; wherein a distance between the first substrate and the second substrate is adjustable; and an orthogonal projection of at least part of
(Continued)

the first through hole on the second substrate coincides with the second through hole.

12 Claims, 5 Drawing Sheets

(58) Field of Classification Search
USPC .......................................................... 362/554
See application file for complete search history.

(56) References Cited

U.S. PATENT DOCUMENTS

| | | | |
|---|---|---|---|
| 8,039,410 B2* | 10/2011 | Kolberg | C03C 13/046 501/64 |
| 2003/0068638 A1* | 4/2003 | Cork | G01N 33/54346 435/6.12 |
| 2004/0213020 A1 | 10/2004 | Gotfried | |
| 2007/0201807 A1* | 8/2007 | Furusawa | G02B 6/3582 385/137 |
| 2009/0303580 A1* | 12/2009 | Popp | G02B 6/264 359/346 |
| 2015/0062956 A1* | 3/2015 | Genier | G02B 6/04 362/554 |

* cited by examiner

LIGHT GUIDE STRUCTURE AND DISPLAY DEVICE

The present disclosure claims priority of Chinese Patent Application No. 201710442895.8 filed on Jun. 13, 2017, the disclosure of which is hereby entirely incorporated by reference as a part of the present disclosure.

TECHNICAL FIELD

At least one embodiment of the present disclosure relates to a light guide structure and a display device.

BACKGROUND

With the development of information technology and the widespread use of the Internet, information security is becoming more and more important. ATMs and other public places need to have anti-peeping capabilities. At the same time, they are required to have a wide viewing angle when presenting public information. However, current ATMs do not have this feature. In addition, electronic products such as mobile phones and tablet computers used in business places and public places such as subways and buses need to have anti-peeping functions to protect trade secrets and privacy, but when users need to share display contents with multiple people, the display device are required to display at a wide viewing angle.

At present, the conventional anti-peeping display device uses a peep prevention film. A kind of anti-peeping film adopts ultra-micro shutter technology. On the one hand, the anti-peeping film which is attached to the upper surface of the display screen, is easy to be damaged and the cost of the anti-peeping film is high; on the other hand, this manner cannot take into account the sharing of the wide viewing angle display features and the anti-peeping function with narrow viewing angles. Furthermore, if switching between a wide viewing angle and a narrow viewing angle is achieved by repeatedly mounting and removing the anti-peeping film, it is inconvenience and the screen of the display device may be damaged. Therefore, there is a need for a structure which is easy to be operated and cheap, and which can enable the display device to switch between a wide viewing angle and a narrow viewing angle.

SUMMARY

At least one embodiments of the present disclosure a light guide structure, comprising: a first substrate comprising at least one first through hole; a second substrate arranged opposite to the first substrate and comprising at least one second through hole; and at least one fiber bundle, each of the at least one fiber bundle passing through one of the at least one first through-hole and one of the at least one second through-hole which are disposed opposite to each other, each of the at least one fiber bundle comprising a first end and a second end, the first end of each of the fiber bundle fixed in one of the first through holes, and the second end of the fiber bundle is a free end; wherein a distance between the first substrate and the second substrate is adjustable; and an orthogonal projection of at least part of the first through hole on the second substrate coincides with the second through hole.

For example, in the light guide structure according to at least one embodiment of the present disclosure, the first substrate comprises a plurality of first through holes, the second substrate comprises a plurality of second through holes, the plurality of first through holes have a same aperture and are regularly disposed on the first substrate, and the plurality of second through holes have a same aperture and are regularly disposed on the second substrate.

For example, in the light guide structure according to at least one embodiment of the present disclosure, an orthogonal projection of the first through hole on the second substrate is within the second through hole.

For example, in the light guide structure according to at least one embodiment of the present disclosure, the first substrate is opaque.

For example, in the light guide structure according to at least one embodiment of the present disclosure, a surface of the first substrate away from the second substrate is provided as a reflective surface.

For example, in the light guide structure according to at least one embodiment of the present disclosure, each of the at least one fiber bundle comprises a plurality of optical fibers.

For example, in the light guide structure according to at least one embodiment of the present disclosure, both the incident end and the exit end of the fiber bundle are polished.

For example, in the light guide structure according to at least one embodiment of the present disclosure, a vertical cross section of the second though hole is wedge-shaped.

For example, in the light guide structure according to at least one embodiment of the present disclosure, horizontal cross sections of the first through and the second through hole are circular or polygonal.

For example, in the light guide structure according to at least one embodiment of the present disclosure, a length of the fiber bundle is greater than a sum of thicknesses of the two substrates by 1 to 2 mm.

For example, the light guide structure according to at least one embodiment of the present disclosure further comprises a distance adjusting device, configured to change a distance between the first substrate and the second substrate so as to change a scattering state of the second end of the fiber bundle.

For example, in the light guide structure according to at least one embodiment of the present disclosure, the distance adjusting device is an electric lifting structure.

At least one embodiment of the present disclosure provides a display device, comprising any one of the light guide structures as described above.

For example, the display device according to at least one embodiment of the present disclosure further comprises a backlight source and a display panel; the light guide structure is disposed between the backlight source and the display panel, the first substrate is disposed facing the backlight source and the second substrate is disposed facing the display panel.

For example, the display device according to at least one embodiment of the present disclosure further comprises a controller, wherein the controller is configured to drive the distance adjusting device.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

REFERENCE SIGNS

1—first substrate; 2—first through hole; 3—second substrate; 4—second through hole; 5—fiber bundle; 6—optical fiber; 7—distance adjusting device; 8—incidence surface; 9—exit surface; 10—display panel; 11—backlight source; 12—second reflective layer, 13—back plate; 14—sealant; 15—incident end; 16—exit end; 17 mounting holes; 18—controller.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein should be commonly understood as having one of ordinary skill in the art to which the present disclosure pertains. The use of "first", "second", and the like in this disclosure does not denote any order, quantity, or importance, but merely serves to distinguish different components. Similarly, "including" or "comprising" and the like means that the presence of an element or item preceding the word encompasses any element or item listed or its equivalence after the word, and does not exclude other elements or items. The words "connect" or "link" and the like are not limited to physical or mechanical connections, but can include electrical connections, whether direct or indirect. "Up", "Down", "Left", "Right" and the like are only used to represent relative positional relationships, and when the absolute position of the described object is changed, the relative positional relationship may also be changed accordingly.

The dimensions of the drawings used in the present disclosure are not drawn strictly in actual scale, and the number of first through holes, second through holes, the number of optical fiber bundles, and the number of optical fiber included in each optical fiber bundle are not fixed to the number illustrated in the figures. And the specific size and number can be determined according to actual requirements, and the depicted drawings are just illustrative.

The "horizontal cross-section" in the present disclosure refers to the cross-section in the direction parallel to the first substrate, and the "vertical cross-section" refers to the cross-section in the direction perpendicular to the first substrate.

The meaning of "aperture" in the present disclosure is that in the case where the horizontal cross section of the first through hole or the second through hole is a circle, the hole diameter refers to the diameter of the circle; in the case where the horizontal cross section of the first through hole or the second through hole is a polygon (for example, a rectangle), it is the length of the diagonal of the polygon.

In the description of the embodiments of the present disclosure, an example in which the surface of the first substrate far away from the second substrate is the incident surface and the surface of the second substrate far away from the first substrate is the exit surface is taken as an example. The incident surface is a surface of the first substrate which is relatively close to the light source when the light guide structure is operated, and the exit surface is a surface of the second substrate that is relatively far from the light source when the light guide structure is operated.

In the light guide structure according to the present disclosure, the first end and the second end of the fiber bundle may be interchanged. In the embodiment of the present disclosure, an example in which the first end of the fiber bundle is the incident end and the second end of the fiber bundle is exit end is described. The incident end is the end of the fiber bundle that is relatively close to the light source when the light guide structure is operated, and the exit end is the end of the fiber bundle that is farther from the light source when the light guide structure is operated.

Light-guide fiber (also known as "optical fiber") is an optical transmission medium that is manufactured in accordance with the principle of total reflection of light. An optical fiber is generally a symmetrical cylinder of a multi-layer dielectric structure consisting of a core, a cladding, and a coating layer. Typically, the core is made of a transparent material (eg, glass, plastic); the cladding is around the core and is made of a material with a slightly lower refractive index than the core; and the coating layer is on the outside of the cladding, and is configured to protect the optical fiber from external damage and to enhance the mechanical strength of the optical fiber. The outermost layer of the optical fiber can be a jacket, which is usually a plastic tube that provides protection. Optical signals injected into the core are totally reflected by the interface of the cladding and propagate in the core. Fibers can be bundled into bundles.

At least one embodiment of the present disclosure provides a light guide structure comprising a first substrate comprising at least one first through hole; a second substrate arranged opposite to the first substrate and including at least one second through hole; and at least one fiber bundle, each of the at least one fiber bundle passing through one of the at least one first through-hole and one of the at least one second through-hole which are disposed opposite to each other, each of the at least one fiber bundle comprising a first end and a second end, the first end of each of the fiber bundle fixed in one of the first through holes, and the second end of the fiber bundle is a free end. A distance between the first substrate and the second substrate is adjustable; the orthogonal projection of at least part of the first through hole on the second substrate coinciding with the second through hole.

At least one embodiment of the present disclosure provides a display device comprising the light guide structure as described above.

The technical solutions and effects of the present disclosure are described in detail in connection with several specific embodiments.

An embodiment of the present disclosure provides a light guide structure comprising a first substrate comprising at least one first through hole; a second substrate arranged opposite to the first substrate and including at least one second through hole; and at least one fiber bundle, each of the at least one fiber bundle passing through one of the at least one first through-hole and one of the at least one second through-hole which are disposed opposite to each other, each of the at least one fiber bundle comprising a first end and a second end, the first end of each of the fiber bundle fixed in one of the first through holes, and the second end of the fiber bundle is a free end. A distance between the first substrate and the second substrate is adjustable; the orthogonal projection of at least part of the first through hole on the second substrate coinciding with the second through hole.

Figure 1A:
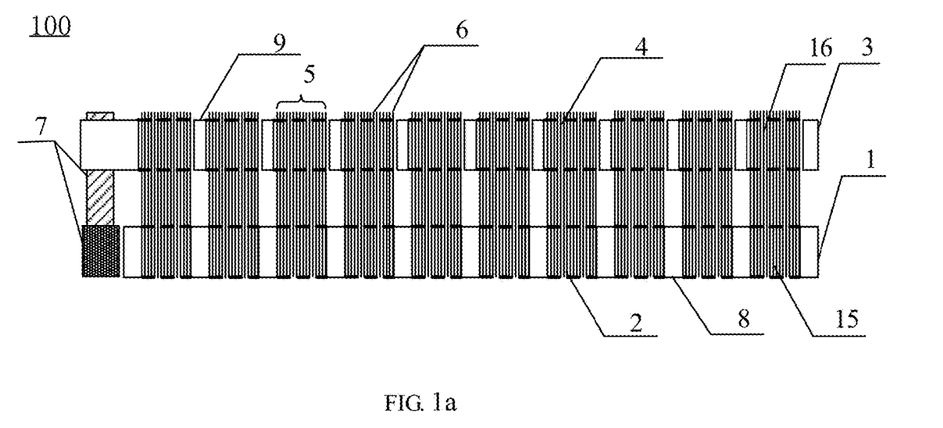
FIG. 1a is a schematic cross-sectional view of a light guiding structure in a narrow viewing angle according to an embodiment of the present disclosure.
Figure 1B:
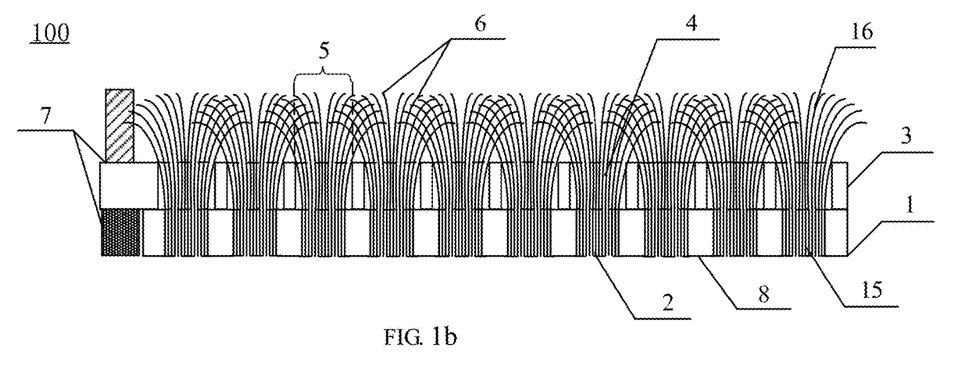
FIG. 1b is a schematic cross-sectional view of a light guide structure in a wide viewing angle state according to an embodiment of the present disclosure.

FIG. 1a is a schematic cross-sectional view of a light guide structure in a narrow viewing angle state according to an embodiment of the present disclosure; and FIG. 1b is a schematic cross-sectional view of a light guiding structure in a wide viewing angle state according to an embodiment of the present disclosure. The light emitted by the light guide structure has better directivity in a narrow viewing angle state than in a wide viewing angle state, and the light beam has a smaller exit angle range.

Referring to FIGS. 1a and 1b, the light guide structure 100 comprises a first substrate 1, a second substrate 3, and a plurality of fiber bundles 5. The first substrate 1 comprises a plurality of first through holes 2 regularly disposed thereon. The plurality of fiber bundles 5 each comprises an incident end 15 and an exit end 16, each fiber bundle 5 comprising a plurality of optical fibers 6 arranged in juxtaposition with each other. For example, the incident end 15 of each optical fiber bundle 5 is fixed in the first through hole 2, whereby the optical fiber bundle 5 cannot be moved in a direction perpendicular to the surface of the first substrate 1. For example, a plurality of light guide fibers 6 can be bundled into a fiber bundle 5 through a binding structure, such as a binding rope, and an incident end 15 of the fiber bundle 5 can be bonded to the inner wall of the first through hole 2 using adhesive so that the incident end 15 of the fiber bundle 5 is fixed in the first through hole 2. The second substrate 3 is disposed opposite to the first substrate 1, for example, the second substrate 3 is parallel to the first substrate 1. The second substrate 3 includes a plurality of second through holes 4 each disposed opposite to one of the plurality of first through holes 2, that is, orthographic projection of at least part of the first through hole 2 on the second substrate 3 coincide the second through hole. These second through holes 4 are also regularly arranged on the second substrate 3, and accordingly the exit end 16 of each fiber bundle 5 is passing through the second through hole 4. The optical fibers included in each fiber bundle 5 are not fixed to each other at the exit end 16 of the fiber bundle 5, and the exit end 16 of the fiber bundle 5 is a free end, for example, they can be scattered without the constraint of the second through hole 4, that is, being in a scattering state in its natural state.

In the light guide structure 100, each fiber bundle 5 constitutes a light passage, and light from a light source (backlight) can be incident, for example, perpendicularly or non-perpendicularly on the incident end surface of the fiber bundle 5 and refracted into the fiber bundle 5. The light satisfying the total reflection condition is transmitted from the incident end 15 of the fiber bundle 5 to the exit end 16 through multiple total reflections, and is emitted from the exit end 16. The state of the exit end 16 of the fiber bundle 5 can determine the direction of the exit light.

The distance between the first substrate 1 and the second substrate 3 is adjustable. In the narrow viewing angle state as illustrated in FIG. 1a, the distance between the first substrate 1 and the second substrate 3 in a direction perpendicular to the surface of the second substrate 3 ("exit direction") is large, so that the exit end 16 of each fiber bundle 5 is received in the second through hole of the second substrate 3 such that the ends of the plurality of optical fibers therein are substantially directed toward the exit direction, whereby the light emitted from the optical fibers is also substantially in the exit direction, thereby having good directionality and exit angles of the beam being small.

In the wide viewing angle state as illustrated in FIG. 1b, the distance between the first substrate 1 and the second substrate 3 in the exit direction is small, so that the exit end 16 of each fiber bundle 5 goes out from the second through hole on the second substrate 3 and is in a scattered state, and is scattered in a relatively great angle range (for example, angle of 30 to 60 degrees) with respect to the exit direction. Thereby, the light emitted from these optical fibers is also distributed substantially in a relatively large angle range with respect to the exit direction, with poor directionality, the light has a wide range of exit angles.

In addition, as illustrated in FIG. 1a, in the narrow viewing angle state, the exit end 16 of each fiber bundle 5 is slightly exposed from the exit surface of the second substrate 3, but the exit end 16 can also be not exposed from the second substrate 3, for example, the exit end is flushed with the exit surface or in the second through hole 4. Since the exit end 16 of the fiber bundles 5 passes through the second through holes 4, they are constrained by the second through holes 4 so as to be parallel to each other, so that the entire fiber bundle 5 is linear from the incident end 15 to the exit end 16.

In addition, as illustrated in FIG. 1b, in the wide viewing angle state, the length of the exposed portion of the fiber bundle 5 passing through the second through hole 4 is longer, and is no longer constrained by the second through hole 4, so that in the natural state, it is dispersed into a scattering state, for example, due to the action of gravity. In FIG. 1b, the exit ends 16 of the fiber bundles 5 in adjacent second through holes cross each other, but embodiments of the present disclosure are not limited thereto. For example, the adjacent fiber bundles can be spaced apart by a predetermined distance. For another example, the ends of the optical fibers can be formed to be curved in an unstressed state (i.e., a natural state), for example, and can be straightened when subjected to a force, whereby the exit ends 16 of the optical fiber bundles 5 are dispersed into a scattered state when being in a natural state.

In both the narrow viewing angle state and the wide viewing angle state, the incident end 15 of the fiber bundle 5 is always constrained by the first through hole 2 as it is fixed in the first through hole 2, so it is always in a linear shape.

For example, the light guide structure further comprises a distance adjusting device configured to change the distance between the first substrate and the second substrate so that the exit state of the exit end of the fiber bundle can be changed, and the exit direction of light emitted from the fiber bundle can be changed, thereby adjusting the viewing angle. For example, in one example of the present embodiment, the distance adjusting device is an electric lifting structure. As illustrated in FIGS. 1a and 1b, the distance adjusting device 7 is mounted at one end of the light guiding structure 100 and is connected with the second substrate 3. The second substrate 3 is moved by a motor so as to change the distance between the first substrate 1 and the second substrate 3. Of course, in other examples, distance adjusting devices can also be mounted at both ends of the light guide structure.

As illustrated in FIG. 1a, when the distance adjusting device 7 increases the distance between the first substrate 1 and the second substrate 3 so that the exit end of the fiber bundle 5 is constrained by the second through hole 4 and the entire fiber bundle 5 is in a linear shape from its incident end to its exit end, the light is emitted through the fiber bundle 5 in a direction perpendicular to the second substrate 3, and the light guide structure 100 is in a narrow viewing angle state. As illustrated in FIG. 1b, when the distance adjusting device 7 reduces the distance between the first substrate 1 and the second substrate 3 so that the exit end 16 of the fiber bundle 5 is not constrained by the second through hole 4, and thus is in a scattering state. Light emitted from the exit end 16 of the fiber bundle 5 is in all directions, and the exit angle increases. As a result, the light guide structure 100 can achieve switching between a wide viewing angle and a narrow viewing angle.

It should be noted that the distance adjusting device is not limited to an electric lifting structure such as an electrostriction structure, a micro-electromechanical switch (MEMS), etc. It can also be other mechanical lifting structure. For example, the distance adjusting device can also be a mechanical lifting structure, such as moving the second substrate by wedges and return springs, or moving the second substrate by inflating and deflating an airbag. Or the distance adjusting device can be a combination of mechanical and electric modes, and the like. Moreover, the distance adjusting device is also not limited to be connected with the second substrate. For example, the distance adjusting device can be connected with the first substrate to move the first substrate so as to change the distance between the first substrate and the second substrate.

In the present embodiment, as illustrated in FIGS. 1a and 1b, the plurality of fiber bundles 5 can each comprise a plurality of optical fibers 6, for example, a plurality of optical fibers 6 being arranged side by side. Increasing the number of optical fibers 6 facilitates increasing the scattering directions of the exit ends 16 and increases the exit angle of light, so that a wider viewing angle can be obtained under the wide viewing angle state. For example, the diameter of each optical fiber 6 can be no more than 20 µm, such as 5 to 20 µm, for example 10 µm. As such, under the same aperture of the first through hole, the diameter of the optical fiber is not so great that the number of optical fibers received in each first through hole is too small to facilitate the expansion of the viewing angle.

Figure 2:
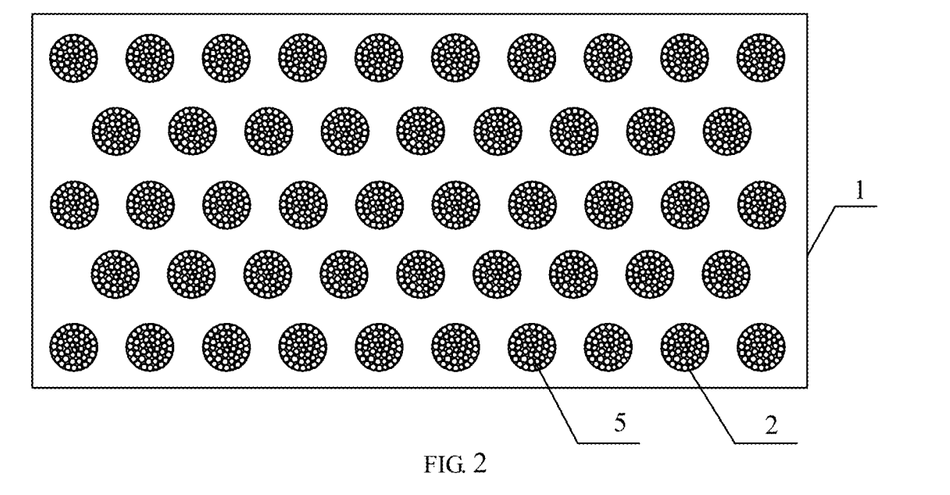
FIG. 2 is a schematic plan view of a light guide structure according to an embodiment of the present disclosure.

FIG. 2 is a schematic plan view of the light guide structure illustrated in FIGS. 1a and 1b. An incident end surface of the fiber bundle 5 formed by a plurality of optical fibers arranged side by side and fixed in each first through hole 2 can be seen in FIG. 2, the incident end surface is formed by the incident end surfaces of the plurality of optical fibers arranged compactly. As illustrated in FIG. 1a, FIG. 1b and FIG. 2, the end surfaces of the incident end 15 and the exit end 16 of the fiber bundle 5 can be polished, for example, such that the end surfaces of the respective optical fibers can be in the same plane so as to make the end surface smoother. Thus, the amount of light that is refracted and reflected by the end surface can be reduced, and the transmittance of light through the fiber bundle 5 can be improved.

It should be noted that, it is possible to adopt a plurality of fixing methods for fixing the incident end of the fiber bundle in the first through hole. For example, the incident end 15 of the fiber bundle can be fixed in the first through hole 2 by using glass cement or the like. More specifically, for example, firstly the incident ends of a plurality of optical fibers can be bundled to form a fiber bundle, and then the incident end of the fiber bundle 5 can be bonded to the wall of the first through hole.

Figure 3:
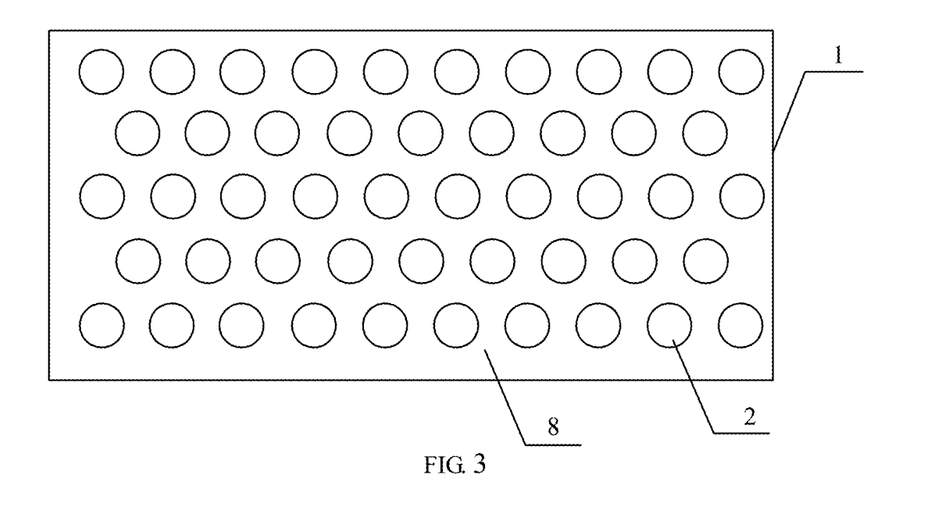
FIG. 3 is a schematic diagram of a first substrate of a light guide structure according to an embodiment of the present disclosure.

FIG. 3 is a schematic view of an incident surface of the first substrate of the light guide structure illustrated in FIGS. 1a and 1b. In FIG. 3, the first substrate 1 can be an opaque substrate, for example, made of aluminum (Al), such that light cannot pass through the first substrate 2, and can only be transmitted by the fiber bundle fixed in the first through hole 2. When the light guiding structure is in working state, it is beneficial to block the outgoing light in all directions except the direction of the optical fiber to so as to create a better narrow viewing angle effect.

For example, the first substrate 1 is a white substrate which does not absorb light of any specific wavelength in the wavelength range of visible light. An incident surface 8 of the white opaque first substrate 1 can reflect all the visible light from the light source so as to make the light enter the first through hole 2 through multiple reflections and transmitted by the fiber bundle, thereby increasing the utilization of light.

The incident surface 8 of the first substrate 1 can be provided as a reflective surface, for example, it can be provided as a reflective layer (not shown) or is subjected to a reflective treatment, which is advantageous for improving the reflectivity of the incident surface 8 and making the light incident on the incident surface 8 enter the fiber bundle provided in the first through hole 2 as much as possible through multiple reflections, so as to increase the utilization of light.

It should be noted that the first substrate can also be made of a transparent material, and the incident surface can be coated with a reflective layer. For example, the first substrate can be made of polystyrene (PS), polyethylene terephthalate (PET), or the like, and a metal (such as Al) layer can be formed on the incident surface thereof as a reflective layer.

Figure 4:
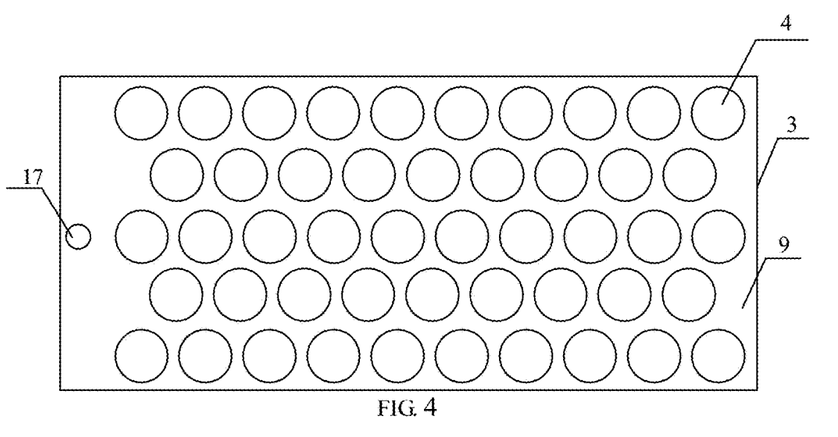
FIG. 4 is a schematic diagram of a second substrate of a light guiding structure according to an embodiment of the present disclosure.

FIG. 4 is a schematic diagram of a second substrate of the light guide structure illustrated in FIGS. 1a and 1b. In FIG. 4, the second substrate can be a transparent substrate, and a reflective layer can be saved without affecting emitting of light in the narrow viewing angle state and in the wide viewing angle state. For example, the area of the second substrate 3 is slightly larger than that of the first substrate, and a mounting hole 17 is provided at an increased area for mounting the distance adjusting device illustrated in FIG. 1a. However, this is not required, and the opposite area of the two substrates and whether or not the mounting hole is provided depends on how the distance adjusting device is installed.

As illustrated in the figure, the first substrate 1 comprises a plurality of first through holes 2, the second substrate 3 comprises a plurality of second through holes 4, and the plurality of first through holes 2 have the same aperture and are evenly arranged on the first substrate 1. The plurality of second through holes 4 have the same aperture and are evenly arranged on the second substrate 3. If the number of the first through hole 2 and the second through hole 3 is increased, it facilitates to produce more dispersion directions of the optical fiber under a wide viewing angle state, thereby increasing the light emission direction and facilitating the expansion of the viewing angle. The even distribution of the holes 2 and the second through holes 3 is conducive to uniform distribution of the emitted light, and the brightness of the display screen of the display device using the light guide structure can be made more uniform; the first through holes 2 and the second through holes 3 being closely distributed can improve the light transmission area and improve the utilization of light. For example, the apertures of the first through hole 2 and the second through hole 3 are not greater than 0.5 mm, for example, 0.1 to 0.5 mm, and are uniformly arranged on the substrate with the same aperture. In this size range, the difference between brightness and darkness on the display screen of the display device which adopts the light guide structure is not easily perceived by the human eyes, and it is advantageous to improve the display quality.

As illustrated in FIGS. 1a, 1b, and 2-4, an orthographic projection of the first through hole 2 on the second substrate is within the second through hole 4. That is, the aperture of the first through hole 2 is less than the aperture of the second through hole 4. On the one hand, in the narrow viewing angle state and the wide viewing angle state, the fiber bundle 5 will move within the second through hole 4, the outer layer of the optical fiber bundle 5 will rub against the inner wall of the second through hole 4, and the aperture of the second through hole 4 is appropriately greater with respect to the diameter of the first through hole 2, which is advantageous for reducing the friction, protecting the optical fiber bundle and prolonging its service life; on the other hand, the aperture of the second through hole 4 is appropriately greater than that of the second through hole 2, it is also advantageous for the optical fiber 6 to be better dispersed in a wide viewing angle state, thereby facilitating the widening of viewing angle.

It should be noted that the horizontal cross sections of the first through hole 2 and the second through hole 4 illustrated in FIGS. 2-4 are circular, but the horizontal cross section shape of the first through hole and the second through hole is not limited in this embodiment. It may be other shapes, such as elliptical, irregularly curved, polygonal (e.g., rectangular, pentagonal, etc.) or irregular polygonal, and the like. The first through hole 2 and the second through hole 4 illustrated in FIGS. 1a and 1 b have a rectangular vertical cross section, but in this embodiment, the vertical cross section shape of the first through hole and the second through hole is not limited, and may also be other shape.

In addition, in the light guide structure illustrated in FIGS. 1a and 1b, the length of the fiber bundle 5 is greater than the sum of the thicknesses of the two substrates by 1 to 2 mm. In this way, the light guide structure 100 can be switched between a narrow viewing angle state and a wide viewing angle state. At the same time, the thickness of the display device using the light guide structure is not so great.

The light guide structure according to the above embodiments can realize switch between a narrow viewing angle state and a wide viewing angle state, and has a simple structure and is easy to operate. Compared with the anti-peeping film, the production cost is low, and the adoption of the light guide structure can also prevent the thickness of the display device from being increased too much.

Figure 5A:
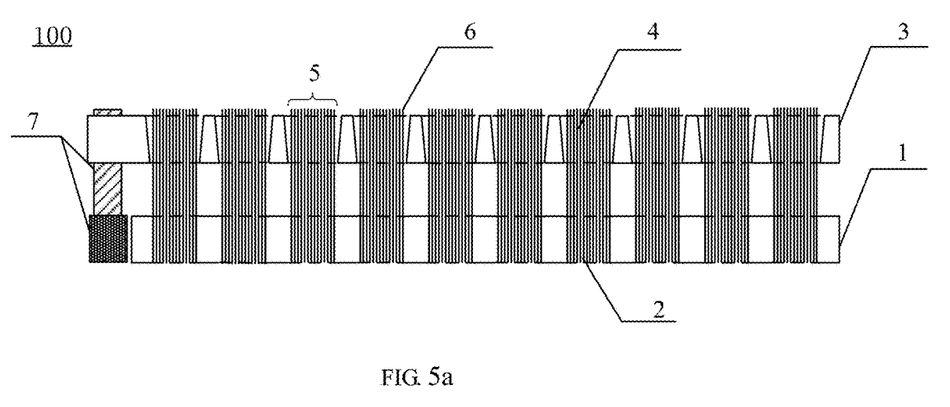
FIG. 5a is a schematic cross-sectional view of another light guide structure in a narrow viewing angle state according to an embodiment of the present disclosure.
Figure 5B:
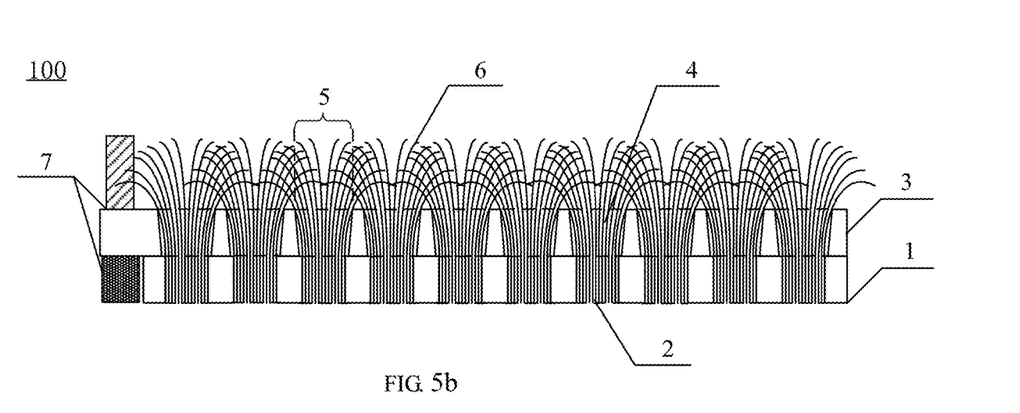
FIG. 5b is a schematic cross-sectional view of another light guide structure in a wide viewing angle state according to an embodiment of the present disclosure.
Figure 6:
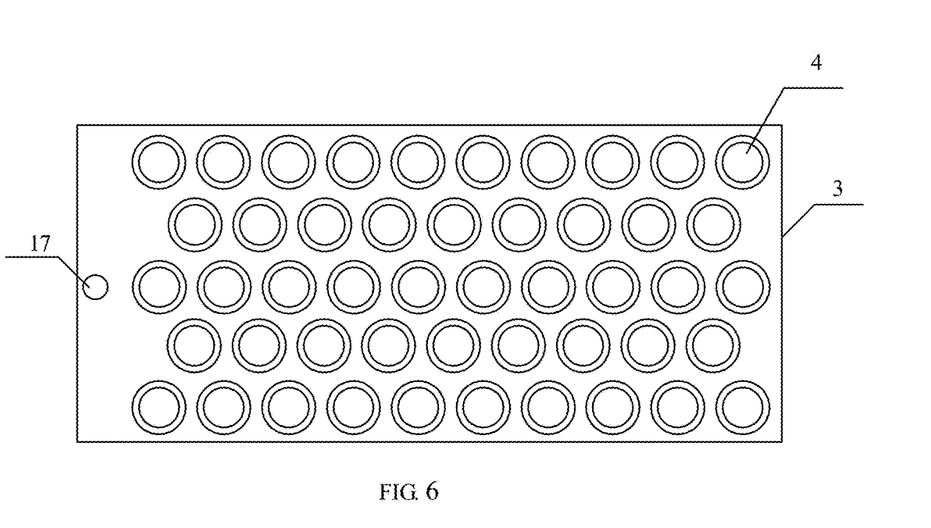
FIG. 6 is a schematic diagram of a second substrate of another light guide structure according to an embodiment of the present disclosure.

FIG. 5a is a schematic vertical cross section view of a light guiding structure according to an embodiment of the present disclosure in a narrow viewing angle state. FIG. 5b is a schematic vertical cross section view of a light guiding structure according to an embodiment of the present disclosure in a wide viewing angle state. FIG. 6 is a schematic diagram of a second substrate of a light guide structure according to another embodiment of the present disclosure.

The difference between the embodiment illustrated in FIGS. 5a, 5b, and 6 and the embodiment illustrated in FIG. 1a lies in that the second through hole 4 on the second substrate 3 has a vertical cross section of wedge-shape, that is, the aperture of the second through hole 4 is gradually increased from the light incident surface 3 to the light emitting surface 9 of the second substrate 3. In this way, when the light guide structure 100 is in a wide viewing angle state as illustrated in FIG. 5b, the second through hole 4 having vertical a cross section wedge-shape facilitates the diffusion of the plurality of optical fibers 6 forming the fiber bundle 5 in various directions, thereby facilitating a wider viewing angle.

The structural features of other aspects of the light guide structure according to the embodiments illustrated in FIG. 5a. FIG. 5b, and FIG. 6 are the same as those of Embodiment 1, and reference can be made to the description in Embodiment 1, and details are not described herein again.

Figure 7:
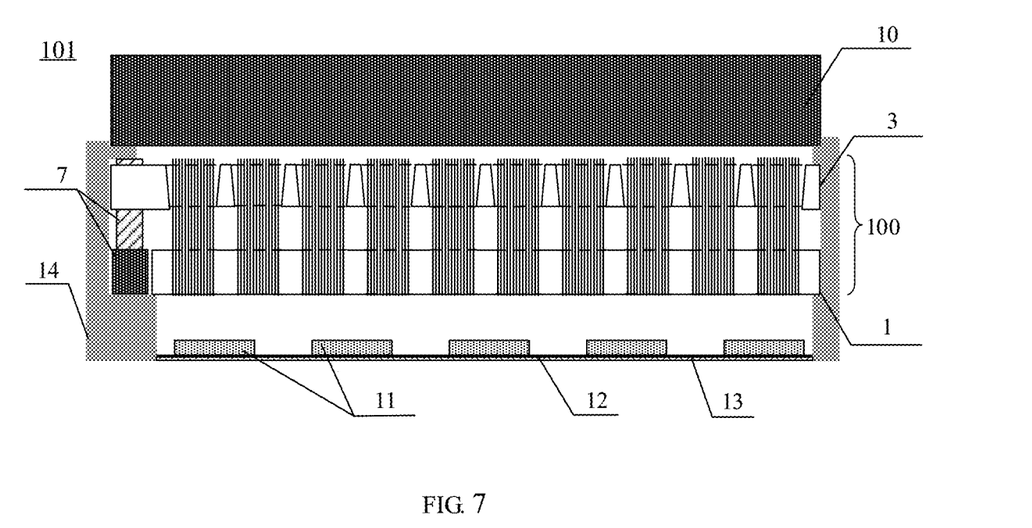
FIG. 7 is a schematic sectional view of a display device provided by an embodiment of the present disclosure.

An embodiment of the present disclosure provides a display device comprising any one of the light guide structures as described above. FIG. 7 is a schematic cross-sectional view of a display device according to an embodiment of the present disclosure. The display device 101 further comprises a backlight 11 and a display panel 10. The light guide structure 100 is disposed between the backlight 11 and the display panel 10. The substrate is disposed facing the backlight 11, and the second substrate is disposed facing the display panel 10. The backlight 11 is disposed on a back plate 12. For example, the back plate 12, the light guide structure 100, and the display panel 10 are fixed to each other through the sealant 14, the rear board 13, and the like.

The display panel is, for example, a liquid crystal display panel or an electronic paper display panel. The liquid crystal display panel may be a transmissive liquid crystal display panel or a transflective liquid crystal display panel.

In the operation of the display device 101, when light from various directions emitted by the backlight 11 is incident on the light incident surface of the light guide structure 100, light directly incident on the end surface of the fiber bundle enters the fiber bundle and is transmitted in the light guide fiber. The light satisfying the total reflection condition is transmitted from the incident end of the fiber bundle to the exit end of the fiber bundle after multiple total reflections, and exits in the direction of each of the optical fibers that constitute the fiber bundle at the exit end. A part of the light emitted from the backlight 11 is incident on the incident surface of the first substrate. Since the incident surface of the first substrate is opaque, the light is reflected by the reflective layer (not shown) coated on the surface of the substrate or by the surface itself and reflected by the back plate, part of the light will enter the fiber bundle, and the rest of the light will be reflected for multiple times to enter the fiber bundle and to be transmitted. The light emitted from the exit end of the fiber bundle enters the display panel 10, so the direction of the exit end of the fiber bundle determines the range of the exit angle of light, thereby determining the viewing angle range that the display device 101 can present.

A distance between the first substrate 1 and the second substrate 3 is changed by the distance adjusting device 7 of the light guide structure 100 to achieve conversion between the linear and the scattering shapes of the exit end of the fiber bundle. When the exit end of the fiber bundle is linear, it can be substantially perpendicular to the display panel 10, and the light is emitted perpendicular to the display panel 10. Therefore, the range of formed viewing angle is narrow, and the user of the display device 101 can see the display content on the display panel 10 at basically positive positions, so that it is possible to prevent the other persons from seeing the displayed content and realize the anti-peeping function; when the exit end of the fiber bundle is in a scattering shape, there is an optical fiber that is oriented toward the display panel 10 from all directions and light enters the display panel 10 from all directions. Therefore, the display device 101 can obtain a wide range of viewing angles at this time, and the display content will be shared with the surrounding people. The user of the display device 101 does not have to face the display panel 10 positively to see the display content. In this way, the display device 101 can realize conversion between a wide viewing angle state and a narrow viewing angle state.

Figure 8:
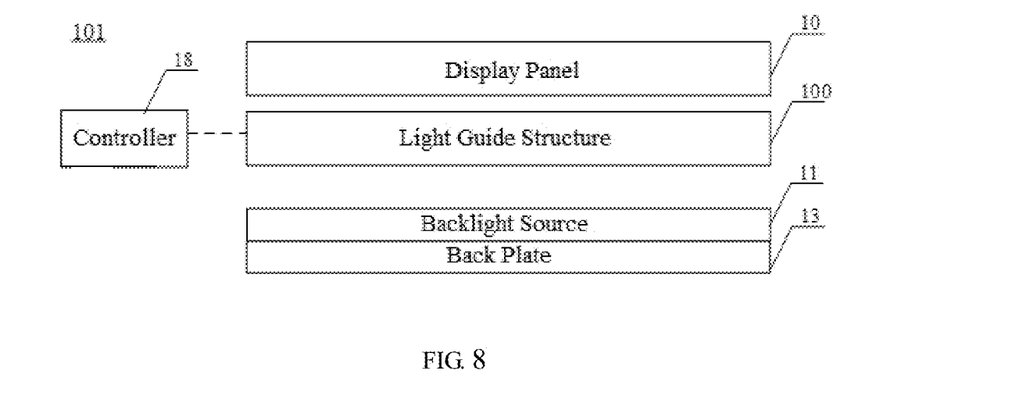
FIG. 8 is a schematic diagram of a display device provided by an embodiment of the present disclosure.

For example, FIG. 8 is a schematic diagram of a display device according to an embodiment of the present disclosure. As illustrated in FIG. 8, the display device 101 further comprises a controller 18. The controller 18 is configured to drive the distance adjusting device. The controller 18 can be configured and used in a variety of ways. For example, the controller 18 can be electrically connected to the light guide structure and conducts electrical signals to drive the distance adjustment device. For example, the controller 18 can also be disposed inside the display structure and controls the driving of the distance adjusting device through a program so as to change the distance between the first substrate and the second substrate to switch the display device 101 between at a narrow viewing angle state and a wide viewing angle state. One of ordinary skill in the art can reasonably design the configuration and usage of the controller according to the requirements of a specific product. The controller can be implemented in various forms such as a central processing unit (CPU), a signal processor, a programmable controller, and the like, for example.

In addition, a second reflective layer 12 can be disposed on the back plate 13, and a portion of the light emitted from the backlight 11 irradiated onto the second reflective layer 12 can be reflected by the second reflective layer 12 to enter the fiber bundle for being transmitted, thereby enhancing the utilization of light.

It should be noted that, in the above figure, the backlight source 11 is of a direct type and comprises a point light source such as an LED, an OLED, etc. the type of the backlight source is not limited in the embodiments of the present disclosure and can be selected according to specific requirements. For example, the backlight 11 can be of a side type, and thus can comprise a light guide plate and a light source (for example, a point light source, a line light source) disposed on the side of the light guide plate.

For example, according to actual requirements, the light guide structure according to the embodiments of the present disclosure can be disposed in an area corresponding to the entire display panel 10 to achieve a controllable viewing angle of the entire display panel 10; the light guide structure according to the embodiments of the present disclosure can be disposed in an area corresponding to a portion of the display panel 10, to achieve a locally controllable viewing angle of the display panel 10.

It should be noted that the embodiments of the present disclosure only provide a basic structure of a display device comprising any one of the above light guide structures. For other specific structural designs, one of ordinary skill in the art can make reference to conventional techniques or select according to actual requirements.

An embodiment of the present disclosure provides a method of adjusting viewing angle applicable to the above display device. The method comprises: driving a distance adjusting device to increases a distance between the first substrate and the second substrate, so that an exit angle of the exit end of the fiber bundle is decreased so as to obtain a narrow viewing angle; or driving the distance adjusting device to decrease the distance between the first substrate and the second substrate so that the exit angle of the exit end of the fiber bundle is increased so as to obtain a wide viewing angle.

For example, when the viewing angle adjustment is performed on the display device 101 illustrated in FIG. 7 and FIG. 8, when the display device 101 is required to be displayed at a narrow viewing angle, the controller 18 receives the first indication signal corresponding to the narrow viewing angle display, and drives the distance adjusting device 7 to increase the distance between the first substrate 1 and the second substrate 3, so that the exit end of the fiber bundle is substantially located in the second through hole, and the light exit angle is reduced to obtain a narrow viewing angle, thus obtain the anti-peeping function; When it is required to be switched to display in a wide viewing angle, for example, to display sharing information, the controller 18 receives the second indication signal corresponding to the wide viewing angle display, and drives the distance adjusting device 7 to reduce the distance between the first substrate 1 and the second substrate 3, so that the exit end of the fiber bundle extends beyond the second through hole and away from the surface of the second substrate, and is scattered around, and the exit end of the fiber bundle is scattered. The exit angle becomes larger, thus obtaining a wide viewing angle. In this way, the display device can be switched between a narrow viewing angle display and a wide viewing angle display. During operation, the indication signal can be generated by a system judgement or input manually, for example, through a key or the like; accordingly, the controller 18 can be controlled by a background program, or can be controlled by an input device such as a button, a touch screen, or the like connected thereto. Specific configuration of the controller can be reasonably selected and designed according to the specific type of the display device 101.

To sum up, the light guide structure according to at least one embodiment of the present disclosure can realize switching between a narrow viewing angle and a wide viewing angle of a display device adopting the light guiding structure. The light guide structure is simple in configuration, easy to operate, and the production cost is low. And at the same time, adopting such a light guide structure can prevent thickness of the display device from being increased too much. The light guide structure can be applied to display devices in public places such as ATMs, and can also be applied to electronic products such as mobile phones and tablet computers to meet users' requirements for conversion of anti-peeping and display content sharing.

The foregoing are merely exemplary embodiments of the disclosure, but are not used to limit the protection scope of the disclosure. The protection scope of the disclosure shall be defined by the attached claims.

The invention claimed is:

1. A display device, comprising a light guide structure for enabling the display device to switch from a wide viewing angle to a narrow viewing angle, wherein the light guide structure comprises:
   a first substrate comprising a plurality of first through holes;
   a second substrate arranged opposite to the first substrate and comprising a plurality of second through holes, wherein the aperture of each first through hole in a direction parallel to the first substrate is smaller than the aperture of a corresponding second through hole in a direction parallel to the first substrate; a vertical cross-section profile of each second through hole in the direction perpendicular to the second substrate is wedge-shaped, the second substrate includes an entrance surface facing the first substrate and an exit surface facing away from the first substrate, and the aperture of the plurality of second through holes in a direction parallel to the entrance surface to the exit surface gradually increases; and
   a plurality of fiber bundles, each fiber bundle includes a plurality of light guide fibers arranged in parallel, each of the plurality of light guide fibers includes an incident end and an exit end, and the incident ends of all of the plurality of light guide fibers of the same optical fiber bundle are fixed to the same first through hole, and the exit ends of all the plurality of light guide fibers of the same fiber bundle pass through the same second hole and are scattered in a natural state; and
   an opening and closing device configured to change a distance between the first substrate and the second substrate so as to change the exit states of the exit ends of the optical fiber bundles.

2. The display device according to claim 1, further comprising a backlight source and a display panel;
   wherein the light guide structure is disposed between the backlight source and the display panel, the first substrate is an incident substrate disposed facing the backlight source and the second substrate is an exit substrate disposed facing the display panel.

3. The display device according to claim 1, further comprising a controller, wherein the controller is configured to drive the distance adjusting device.

4. The light guide structure according to claim 1, wherein the plurality of first through holes are incident through holes, the plurality of second through holes are exit through holes, and an orthogonal projection of each of the first through holes on the second substrate is within a corresponding second through hole.

5. The light guide structure according to claim 1, wherein the first substrate is opaque.

6. The light guide structure according to claim 1, wherein a surface of the first substrate away from the second substrate is provided as a reflective surface.

7. The light guide structure according to claim 1, wherein both the incident end and the exit end of each fiber bundle are polished.

8. The light guide structure according to claim 1, wherein the plurality of first through holes have a same aperture and are regularly disposed on the first substrate.

9. The light guide structure according to claim 1, wherein horizontal cross section profiles of the first through hole and the second through hole are circular or polygonal.

10. The light guide structure according to claim 1, wherein a length of each fiber bundle is greater than a sum of thicknesses of the two substrates by 1 to 2 mm.

11. The light guide structure according to claim 1, further comprising a distance adjusting device configured to change a distance between the first substrate and the second substrate so as to change a scattering state of the second ends of the plurality of fiber bundles.

12. The light guide structure according to claim 11, wherein the distance adjusting device is an electric lifting structure.

* * * * *